(12) United States Patent
Yun et al.

(10) Patent No.: US 9,813,207 B2
(45) Date of Patent: Nov. 7, 2017

(54) TRANSMITTING APPARATUS, RECEIVING APPARATUS, AND CONTROLLING METHOD THEREOF

(71) Applicant: SAMSUNG ELECTRONICS CO., LTD., Suwon-si (KR)

(72) Inventors: Sung-ryul Yun, Suwon-si (KR); Young-ho Oh, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 69 days.

(21) Appl. No.: 14/341,908

(22) Filed: Jul. 28, 2014

(65) Prior Publication Data

US 2015/0029962 A1 Jan. 29, 2015

(30) Foreign Application Priority Data

Jul. 26, 2013 (KR) ........................ 10-2013-0088697

(51) Int. Cl.
*H04L 5/00* (2006.01)
*H04L 27/26* (2006.01)
*H04L 25/02* (2006.01)

(52) U.S. Cl.
CPC .......... *H04L 5/0048* (2013.01); *H04L 5/0051* (2013.01); *H04L 5/0053* (2013.01); *H04L 27/2613* (2013.01); *H04L 27/2692* (2013.01); *H04L 25/0224* (2013.01); *H04L 27/2614* (2013.01); *H04L 27/2655* (2013.01)

(58) Field of Classification Search
CPC . H04L 5/0023; H04L 25/0232; H04L 25/022; H04L 27/2647; H04L 25/0228; H04L 25/0212

See application file for complete search history.

(56) References Cited

U.S. PATENT DOCUMENTS 7,616,719 B1 * 11/2009 Narasimhan ........ H04L 27/2657
375/130
9,094,107 B1 * 7/2015 Kumar .................. H04L 27/103
(Continued)

OTHER PUBLICATIONS

International Search Report dated Nov. 12, 2014 issued by International Searching Authority in counterpart International Patent Application No. PCT/KR2014/006727.

(Continued)

*Primary Examiner* — Jung-Jen Liu
(74) *Attorney, Agent, or Firm* — Sughrue Mion, PLLC

(57) ABSTRACT

A transmitting apparatus includes a symbol generator configured to generate a preamble symbol including signaling data and a reference signal, a frequency allocator configured to allocate first subcarriers and second subcarriers to the signaling data and the reference signal, respectively, in a frequency corresponding to the preamble symbol and map the signaling data and the reference signal to the allocated subcarriers, and a transmitter configured to transmit a signal including the preamble symbol and a data symbol, wherein the reference signal is a signal used for channel estimation or frequency offset compensation. Thus, synchronization is accurately corrected and channel estimation is achieved using the reference signal included in the preamble symbol, thereby reducing a ratio of a pilot included in a data symbol.

18 Claims, 12 Drawing Sheets

(56) References Cited

U.S. PATENT DOCUMENTS

| | | | | |
|---|---|---|---|---|
| 2004/0151109 A1* | 8/2004 | Batra | H04B 1/7163 | 370/208 |
| 2005/0232135 A1* | 10/2005 | Mukai | H04L 5/0007 | 370/208 |
| 2007/0237245 A1* | 10/2007 | Finkelstein | H04L 25/022 | 375/260 |
| 2009/0110033 A1* | 4/2009 | Shattil | H04B 1/7174 | 375/141 |
| 2009/0135761 A1* | 5/2009 | Khandekar | H04L 5/0053 | 370/328 |
| 2009/0225822 A1* | 9/2009 | Tupala | H04L 27/2659 | 375/226 |
| 2009/0274174 A1* | 11/2009 | Hwang | H04W 72/0406 | 370/480 |
| 2010/0027473 A1* | 2/2010 | Ghosh | H04L 27/2613 | 370/328 |
| 2010/0041433 A1* | 2/2010 | Stadelmeier | H04H 20/72 | 455/552.1 |
| 2010/0080312 A1* | 4/2010 | Moffatt | H04B 1/713 | 375/260 |
| 2010/0135316 A1* | 6/2010 | Atungsiri | H04L 5/005 | 370/436 |
| 2010/0195636 A1* | 8/2010 | Nakashima | H04W 72/12 | 370/342 |
| 2010/0195668 A1* | 8/2010 | Robert | H04L 5/0007 | 370/475 |
| 2011/0305287 A1* | 12/2011 | Kwon | H04L 5/0035 | 375/260 |
| 2012/0294294 A1* | 11/2012 | Zhang | H04L 1/0025 | 370/338 |
| 2014/0198875 A1* | 7/2014 | Kim | H04L 27/2627 | 375/295 |

OTHER PUBLICATIONS

Written Opinion dated Nov. 12, 2014 issued by International Searching Authority in counterpart International Patent Application No. PCT/KR2014/006727.

Ershadi et al., "A Preamble-Based Frequency Offset Compensation Scheme in Multiple Input Multiple Output Orthogonal Frequency Division Multiplexing Systems", Journal of Computer Science, 2010, pp. 478-483, vol. 6, Issue 4, Tehran, Iran.

Li et al., "Channel Estimation and Equalization in the Presence of Timing Offset in MB-OFDM Systems", Global Telecommunications Conference, 2007, pp. 3389-3394, Dallas, Texas, U.S.A.

* cited by examiner

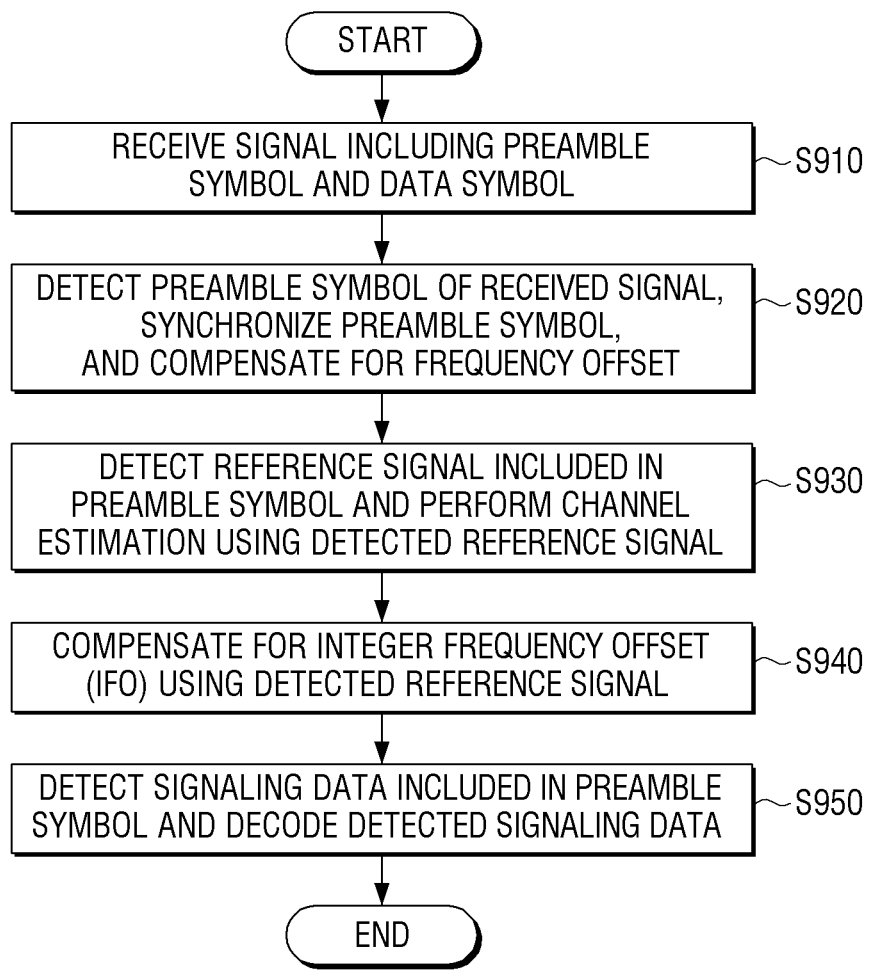

TRANSMITTING APPARATUS, RECEIVING APPARATUS, AND CONTROLLING METHOD THEREOF

CROSS-REFERENCE TO RELATED APPLICATIONS

This application claims priority from Korean Patent Application No. 10-2013-0088697, filed on Jul. 26, 2013, in the Korean Intellectual Property Office, the disclosure of which is incorporated herein by reference in its entirety.

BACKGROUND

1. Field

Apparatuses and methods consistent with exemplary embodiments relate to transmitting and receiving data using a method of Digital Video Broadcasting the Second Generation Terrestrial (DVB-T2).

2. Description of the Related Art

The DVB-T2 is an improved version of DVB-T which is currently adopted in 35 or more countries including Europe around the world. The DVB-T2 applies recent technologies such as a low density parity check (LDPC) code and 256 QAM modulation to realize high transmission capacity and high bandwidth efficiency. Thus, the DVB-T2 can provide various high-quality services such as an HDTV in a limited band.

A T2-FRAME that is currently used in the DVB-T2 includes a P1 preamble symbol, a P2 preamble symbol, and a data symbol. The P1 preamble symbol is used to perform synchronization and to transmit signaling data. A receiver detects the P1 preamble symbol, performs synchronization using the detected P1 preamble symbol, compensates for a frequency offset, and then receives the signaling data.

However, currently, the receiver performs synchronization using the P1 preamble symbol assuming that synchronization is mismatched within 1 sample time. In this case, when delay of a multiple path of a signal is increased, synchronization is mismatched to exceed over 1 sample time. Thus, there is a need for a reference signal for accurately correcting synchronization.

SUMMARY

One or more exemplary embodiments may overcome the above disadvantages and other disadvantages not described above. However, the exemplary embodiments are not required to overcome the disadvantages described above, and may not overcome any of the problems described above.

One or more exemplary embodiments provide transmitting and receiving apparatuses using a preamble symbol including a reference signal, and a controlling method of the apparatuses.

According to an aspect of an exemplary embodiment, there is provided a transmitting apparatus including a symbol generator configured to generate a preamble symbol including signaling data and a reference signal, a frequency allocator configured to allocate first subcarriers and second subcarriers to the signaling data and the reference signal, respectively, in a frequency range, corresponding to the preamble symbol and map the signaling data and the reference signal to the allocated subcarriers, and a transmitter configured to transmit a signal including the preamble symbol and a data symbol, wherein the reference signal is a signal used for channel estimation or frequency offset compensation.

The frequency allocator may allocate the second subcarriers to the reference signal among subcarriers except for the first subcarriers allocated to the data signaling, in the frequency range corresponding to the preamble symbol.

The frequency allocator may randomly allocate the first subcarriers to the signaling data and allocates the second subcarriers to the reference signal at an equal interval.

The reference signal may be a pilot.

According to an aspect of another exemplary embodiment, there is provided a receiving apparatus including a receiver configured to receive a signal including a preamble symbol and a data symbol, a symbol synchronization unit configured to detect the preamble symbol of the received signal, synchronize the preamble symbol and compensate for a frequency offset, a channel estimator configured to detect a reference signal included in the preamble symbol and perform channel estimation using the reference signal, an integer frequency offset (IFO) compensator configured to compensate for an IFO using the reference signal, and a decoder configured to detect signaling data included in the preamble symbol and decode the signaling data.

First subcarriers allocated to the signaling data may be randomly arranged and second subcarriers allocated to the reference signal may be arranged at an equal interval.

The channel estimator may perform channel estimation based on a transmission amount of each of the second subcarriers allocated to the reference signal.

The channel estimator may use channel estimation information based on the reference signal as channel estimation information of the data symbol.

The reference signal may be a pilot.

According to an aspect of still another exemplary embodiment, there is provided a controlling method of a transmitting apparatus, the method including generating a preamble symbol including signaling data and a reference signal, allocating first subcarriers and second subcarriers to the signaling data and the reference signal, respectively, in a frequency range corresponding to the preamble symbol, mapping the signaling data and the reference signal to the allocated first and second subcarriers, and transmitting a signal including the preamble symbol and a data symbol, wherein the reference signal is a signal used for channel estimation or frequency offset compensation.

The allocating may include allocating the second subcarriers to the reference signal among subcarriers except for the first subcarriers allocated to the data signaling in the frequency range corresponding to the preamble symbol.

The allocating may include randomly allocating the first subcarriers to the signaling data and allocating the second subcarriers to the reference signal at an equal interval.

The reference signal may be a pilot.

According to an aspect of still another exemplary embodiment, there is provided a controlling method of a receiving apparatus, the method including receiving a signal including a preamble symbol and a data symbol, detecting the preamble symbol of the received signal, synchronizing the preamble symbol and compensating for a frequency offset, detecting a reference signal included in the preamble symbol and performing channel estimation using the reference signal, compensating for an IFO using the reference signal, and detecting signaling data included in the preamble symbol and decoding the signaling data.

First subcarriers allocated to the signaling data may be randomly arranged and second subcarriers allocated to the reference signal are arranged at an equal interval.

The performing the channel estimation may include performing channel estimation based on a transmission amount of each of the second subcarriers allocated to the reference signal.

The channel estimation may be performed using channel estimation information based on the reference signal as channel estimation information of the data symbol.

The reference signal may be a pilot.

As described above, according to various exemplary embodiments, synchronization may be accurately corrected and channel estimation is achieved using the reference signal included in the preamble symbol, thereby reducing a ratio of a pilot included in a data symbol.

BRIEF DESCRIPTION OF THE DRAWING FIGURES

The above and/or other aspects will be more apparent by describing certain exemplary embodiments with reference to the accompanying drawings, in which:

FIG. 9 is a flowchart for explanation of a controlling method of a receiving apparatus according to an exemplary embodiment.

DETAILED DESCRIPTION OF THE EXEMPLARY EMBODIMENTS

Figure 1:
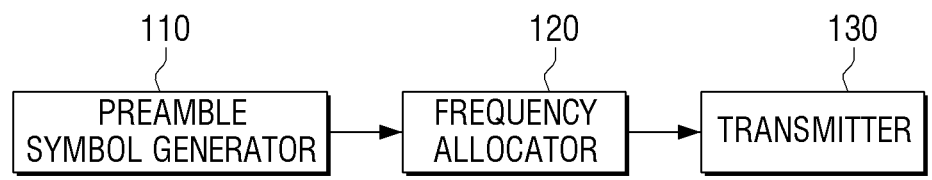
FIG. 1 is a block diagram of a transmitting apparatus according to an exemplary embodiment.

Certain exemplary embodiments of the inventive concept will now be described in greater detail with reference to the accompanying drawings.

In the following description, the like reference numerals are used for the like elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram of a transmitting apparatus 100 according to an exemplary embodiment.

Referring to FIG. 1, the transmitting apparatus 100 includes a preamble symbol generator 110, a frequency allocator 120, and a transmitter 130.

Here, the preamble symbol generator 110 may generate a preamble symbol including signaling data and a reference signal.

According to the present embodiment, the preamble symbol may be used to indicate a start point of a frame to synchronize the frame. The transmitting apparatus 100 may transmit a plurality of signals using a DVB-T2 method. In this case, a unit in which data is transmitted using the DVB-T2 method is referred to as a T2 frame.

Accordingly, a DVB-T2 system and a T2 frame structure will be described in detail.

Figure 2A:
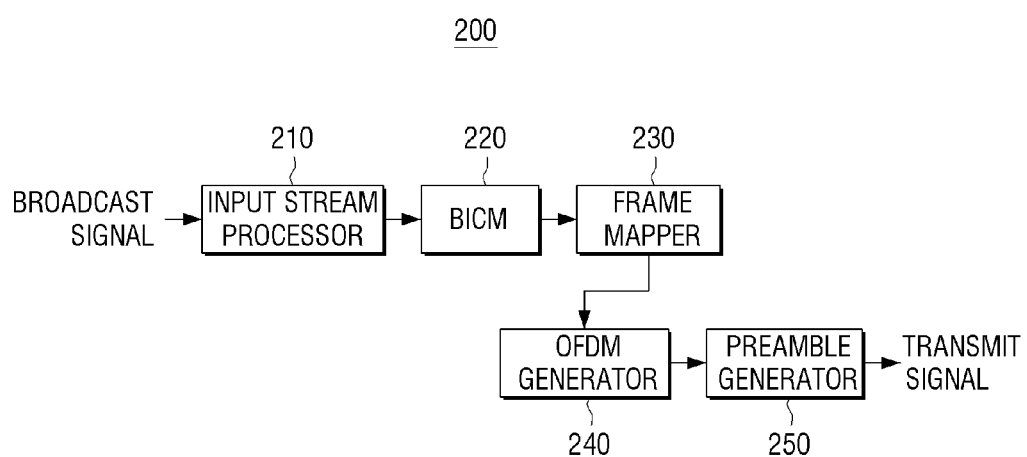
FIGS. 2A and 2B are block diagrams of a DVB-T2 system and a frame structure.
Figure 2B:
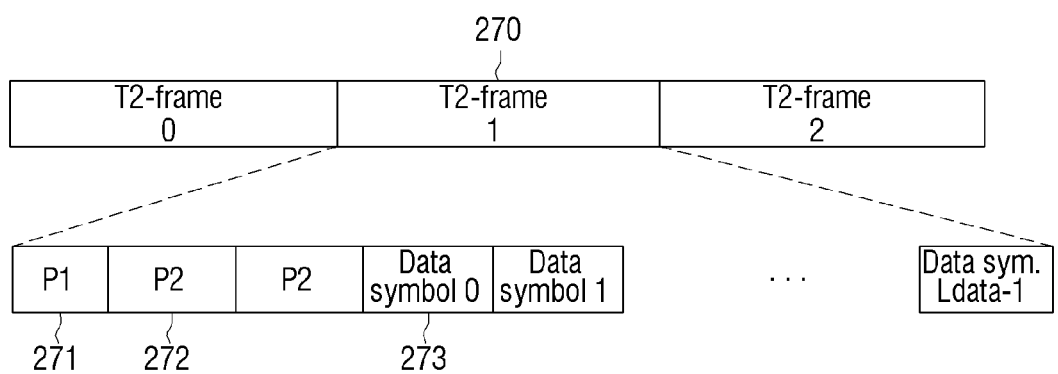

FIGS. 2A and 2B are block diagrams of a DVB-T2 system and a frame structure.

FIG. 2A illustrates a transmitting device 200 that generates a T2 signal using a transmission method of DVB-T2. An input stream processor 210 may process an input broadcast signal to generate a baseband frame format signal therefrom.

A bit-interleaved coded modulation (BICM) calculator 220 may encode the input baseband frame format signal via low density parity check (LDPC) and modulate the encoded signal.

Here, according to the DVB-T2 method, LDPC codes may have a length of 64800 bits and 16400 bits, and an input signal may be encoded at various code rates. The encoded signal may be modulated via quadrature phase shift keying (QPSK), 16 quadrature amplitude modulation (QAM), 64 QAM, or 256 QAM.

A frame mapper 230 may generate a T2 frame structure for orthogonal frequency division multiplexing (OFDM) transmission. Here, the T2 frame structure may include subcarriers for transmission of a signal formed by modulating a broadcast signal, a pilot for channel estimation, and subcarriers (or reserved tones) for reduction in peak to average power ratio (PAPR).

An OFDM generator 240 may convert a signal input from the frame mapper 230 into a signal in a time domain using inverse fast Fourier transform (IFFT) that converts a signal in a frequency domain into a signal in a time domain.

In addition, a preamble generator 250 may add a preamble to a start point of a T2 frame to generate a transmit signal for synchronization of the T2 frame.

FIG. 2B illustrates a plurality of T2 frame structures in a time domain of DVB-T2. One T2 frame 260 may include a P1 preamble symbol 270 for indicating a start point of a frame, a P2 preamble symbol 280 for transmitting a layer 1 (L1) signal, and data symbols 290 for transmitting a broadcast signal.

In detail, a P1 preamble symbol may be positioned at a first portion of a T2 frame and used to detect a start point of a T2 frame. In addition, the P1 preamble symbol is a signal that uses a 1K FFT size in the form of guard interval. In addition, the P1 preamble symbol in a frequency domain may use 384 to 853 subcarriers of 1K FFT and transmit information of 7 bits.

Here, the 7 bit information may be signaling data that may consist of S1 (3 bits) and S2 (4 bits). In addition, the transmitting device 200 may transmit S1 (3 bits) using 8 complementary sequence sets (CSSs) with a length of 64 and transmit S2 (4 bits) using 16 CSSs with a length of 256.

With regard to the configuration of the transmitting device 200 for generating a T2 signal using the aforementioned DVB-T2 transmission method, the preamble symbol generator 110, the frequency allocator 120, and the transmitter 130 of the transmitting apparatus 100 according to the present embodiment may be applied to the preamble generator 250 of FIG. 2A.

The preamble generator 250 of FIG. 2A may correspond to a P1 symbol insertion of a modulator module of a DVB-T2 system.

In detail, when guard insertion (GI) information obtained by copying a last portion of an OFDM symbol from a GI unit and inserting a guard interval into each OFDM symbol in the form of cyclic prefix (CP) is transmitted to a P1 symbol insertion unit, the P1 symbol insertion unit may insert two or more preamble symbols into every frame. Use of two or more preamble symbols may become robust with respect to burst fading that may occur in a mobile fading environment and improve signal detection performance.

In addition, the P1 symbol insertion unit inserts a P1 symbol into a start point of each frame to output to a digital to analog (D/A) converter.

A preamble symbol P1 has four main objectives. First, the preamble symbol P1 is only used to detect P1 for rapid recognition of a T2 signal during sufficient initial signal scanning. A symbol structure facilitates detection of any frequency offset when a receiver is adjusted at a nominal center frequency. Thus, the receiver does not have to separately test all available offset, thereby reducing a scanning time.

A second objective of P1 is to identify a T2 preamble as a preamble. The P1 symbol may be used to identify the preamble from another format used in an FEF part that coexists in the same super frame.

A third objective of P1 is to transmit a basic transmission parameter signal required to decode the remaining portion of a preamble that facilitates an initial process during the initial process. A fourth objective of P1 is to detect and correct frequency and time synchronization via a receiver.

In addition, the D/A converter may convert each signal frame into which the P1 symbol is inserted into an analog signal and transmit the analog signal via a corresponding transmission antenna.

Referring back to FIG. 1, the preamble symbol generator 110 may generate a preamble symbol including signaling data and a reference signal. The signaling data may include S1 (3 bits) and S2 (4 bits) as described above.

In addition, the transmitting apparatus 100 may transmit S1 (3 bits) using 8 CSSs with a length of 64 and transmit S2 (4 bits) using 16 CSSs with a length of 256.

Figure 3A:
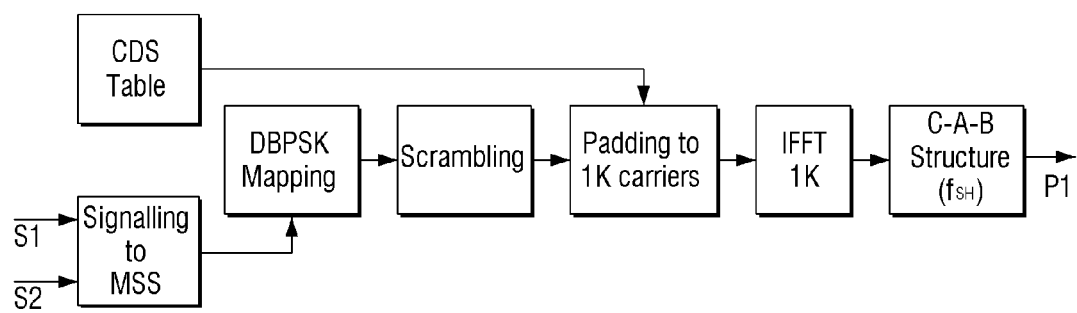
FIGS. 3A and 3B are diagrams for explanation of an operation of a preamble symbol generator according to an exemplary embodiment.

In detail, as illustrated in FIG. 3A, the preamble symbol generator 110 may modulate S1 and S2 as signaling data via differential binary phase shift keying (DBPSK), map S1 and S2 to a subcarrier, scramble S1 and S2, insert S1 and S2 into 1K FFT using a CDS Table, and converts a signal in a frequency domain into a signal in a time domain via IFFT to generate a preamble symbol with a C-A-B structure.

Here, the DBPSK is also called differential binary phase shift modulation and may refer to phase modulation in which a transmitter performs a logical sum with a binary code and performs shift in two phases. The DBPSK corresponds to standardization (IEEE 802.11) for use in a baseband modulation method in a wireless LAN and is used in direct sequence scattered spectrum. In addition, a transmitter side transmits a binary code obtained via a logical sum of codes to be transmitted to correspond and shift the binary code to an opposite phase of the same phase as subcarriers and a receiver side converts the binary code via a logical difference to restore an original pulse.

Figure 3B:
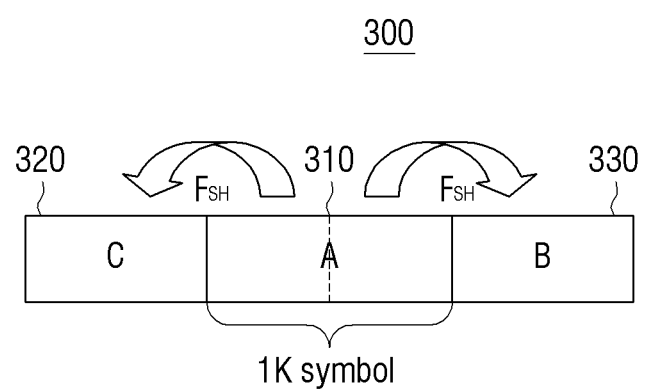

In addition, as illustrated in FIG. 3B, the preamble symbol generator 110 may generate a preamble symbol of a C-A-B structure 300. The C-A-B structure 300 improves frame detection performance and is a structure obtained by combining a region C 320 and a region C 330 obtained by dividing a region A 310 as a symbol with a size of 1K into two portions and copying the two portions combining the region C 320 and the region C 330 to front and rear parts of the region A 310.

The reference signal may be a signal for channel estimation or frequency offset compensation. Here, the channel estimation or the frequency offset compensation will be described in detail.

According to an exemplary embodiment, the reference signal may be a pilot.

The pilot may be used for channel estimation, equalization, common phase estimation (CPE), and synchronization of a receiving apparatus.

The pilot may be divided into a P2 pilot, a frame closing pilot of a frame closing symbol, etc. included in the P2 symbol only as well as a scattered pilot and a continual pilot.

Here, a pilot used as the reference signal according to an exemplary embodiment may be a scattered pilot.

The scattered pilot may be a pilot that is constantly inserted in time and frequency directions, used for channel estimation and synchronization, and used as 8 patterns from PP1 to PP8 according to FFT and a protection section. These patterns are designed according to a maximum length 1/Dx of the protection section and channel Doppler limit 1/Dy, and a pilot size for each respective pattern is higher than general data by as much as 2.5 to 7.4 dB. Thus, overhead due to pilot insertion may be reduced while maintaining sufficient channel estimation performance.

Thus, the preamble symbol generator 110 may generate a preamble symbol including signaling data and a reference signal to perform channel estimation and compensate for frequency offset as well as to perform synchronization and transmit signaling data.

The frequency allocator 120 may allocate subcarriers to the signaling data and the reference signal in a frequency range corresponding to the preamble symbol.

Here, the frequency allocator 120 may allocate subcarriers to the reference signal among subcarriers except for the subcarriers allocated to the signaling data in the frequency range corresponding to the preamble symbol.

In addition, the frequency allocator 120 may randomly allocate the subcarrier to the signaling data and the subcarrier of the reference signal at an equal interval.

That is, the frequency allocator 120 may randomly allocate the subcarrier to the signaling data in the frequency range corresponding to the preamble symbol, and then, allocate the subcarriers to the reference signal among the subcarriers except for the subcarriers allocated to the signaling data in the frequency corresponding to the preamble symbol at an equal interval.

For example, in terms of subcarrier indexes, when the frequency allocator 120 may randomly allocate, to the signaling data, subcarriers at positions 1, 3, 11, 18, 24 . . . 976, 983, 992, and 996 in frequencies 1 to 1000 corresponding to the preamble symbol, the frequency allocator 120 may allocate, to the reference signal, the subcarriers at positions 5, 10, 15, 20 . . . 990, 995, and 1000 except for the positions 1, 3, 11, 18, 24 . . . 976, 983, 992, and 996, at an equal interval.

Here, the frequency allocator 120 may randomly allocate the subcarriers to the signaling data such that a peak to average power ratio (PAPR) is equal to or less than a preset value.

In detail, a PAPR is a ratio of peak power to average power as a reference indicating influence of a baseband transmission signal, exerted on a transmitter. That is, in general, power of the transmitter refers to average power.

However, in reality, peak power is present in transmitted power. The peak power may cause intermodulation to degrade broadcast quality when the transmitter is not appropriately designed. Thus, the transmitting apparatus 100 needs to transmit a broadcast signal to reduce a PAPR.

A PAPR may be increased when subcarriers are allocated at an equal interval. That is, when broadcast signals are transmitted through subcarriers at a constant period, as influence exerted on the transmitter accumulates at an equal time interval, a PAPR is increased to degrade broadcast quality.

Thus, the frequency allocator 120 may randomly allocate the subcarriers to the signaling data, instead of at an equal interval, to reduce a PAPR.

The frequency allocator 120 may map the signaling data and the reference signal to the allocated subcarriers, respectively.

A process of mapping the signaling data to the subcarrier has been described above, and thus, a detailed description thereof is not given here.

Mapping of the reference signal to the subcarrier may be the same as a process of inserting a reference signal into a subcarrier. That is, a pilot insertion unit (not shown) may insert a pilot with a predetermined pilot pattern into a corresponding position in a frame. Likewise, the frequency allocator 120 according to the present embodiment may map the reference signal of the predetermined pilot pattern to the allocated subcarrier.

The transmitter 130 may transmit a signal including a preamble signal and a data symbol. Here, the transmitter 130 may transmit a plurality of signals via OFDM.

In detail, the OFDM refers to a modulation method for multiplexing a high speed transmit signal to a plurality of orthogonal narrowband subcarriers, in which a data stream with a high data rate is divided into a plurality of data streams with a low data rate and the plural data streams are simultaneously transmitted using a plurality of subcarriers. That is, the OFDM is a multiplexing technology in that high speed source data streams of one channel are simultaneously transmitted and is a modulation technology in that divided data streams are carried and transmitted by a multiple subcarrier. In addition, parts of a waveform of each subcarrier are orthogonal in a time axis and overlap each other in a frequency axis.

Thus, the transmitter 130 may categorize a plurality of signals as many data streams, encrypt the categorized data streams using the subcarriers, and apply IFFT and parallel-serial conversion with a subcarrier signal to generate a serial output data stream. In addition, a header may be inserted into the generated data stream and a digital signal may be converted into an analog signal to be transmitted to an antenna. Here, the header may be a preamble symbol.

Figure 4:
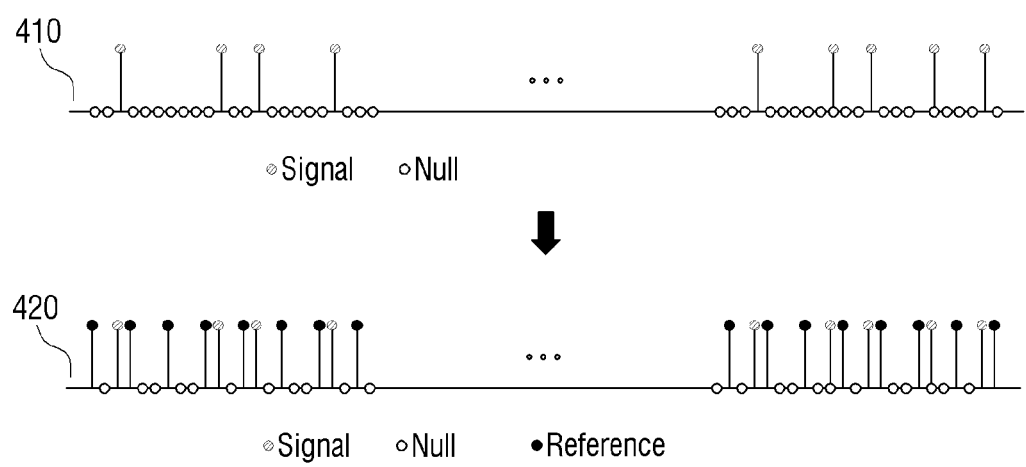
FIG. 4 is a diagram illustrating carriers that are allocated and mapped to a preamble symbol according to an exemplary embodiment.

FIG. 4 is a diagram illustrating carriers that are allocated and mapped to a preamble symbol according to an exemplary embodiment.

As described above, the frequency allocator 120 may randomly allocate subcarriers to signaling data and allocate subcarriers to a reference signal at an equal interval. Referring to FIG. 4, the subcarriers of the signaling data are allocated and mapped to a first preamble structure 410.

Here, the first preamble structure 410 randomly allocate and map only the subcarriers of the signaling data such that a PAPR is equal to or less than a preset value, as described above.

In addition, the subcarriers of the signaling data and subcarriers of a reference signal are allocated and mapped to a second preamble structure 420.

Here, the subcarriers of the signaling data are randomly allocated to the second preamble structure 420 and the subcarriers of the reference signal are allocated at an equal interval as long as the subcarriers of the referring signal do not overlap the subcarriers of the signaling data.

In order to estimate channels and compensate for frequency offset, the subcarriers of the reference signal are allocated and mapped to the second preamble structure 420.

Thus, the preamble symbol generator 110 may transmit signaling data and perform synchronization using the second preamble structure 420 and generate a preamble symbol used to estimate channels and compensate for frequency offset.

Figure 5:
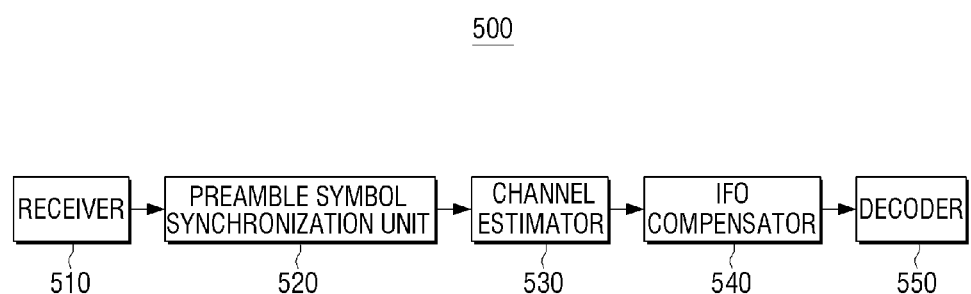
FIG. 5 is a block diagram of a structure of a receiving apparatus according to an exemplary embodiment.

FIG. 5 is a block diagram of a structure of a receiving apparatus 500 according to an exemplary embodiment.

Referring to FIG. 5, the receiving apparatus 500 includes a receiver 510, a preamble symbol synchronization unit 520, a channel estimator 530, an integer frequency offset (IFO) compensator 540, and a decoder 550.

The receiver 510 may receive a signal including a preamble symbol and a data symbol from the transmitting apparatus 100.

Here, the preamble symbol may include signaling data and a reference signal as described above. The reference signal may be a signal for channel estimation or frequency offset compensation. In particular, the IFO compensator 540 of the receiving apparatus 500 may compensate for IFO using the reference signal.

According to an exemplary embodiment, the reference signal may be a pilot.

The pilot may be used for channel estimation, equalization, common phase estimation (CPE), and synchronization of a receiving apparatus.

The pilot may be divided into a P2 pilot, a frame closing pilot of a frame closing symbol, etc. included in the P2 symbol only as well as a scattered pilot and a continual pilot.

Here, a pilot used as the reference signal according to an exemplary embodiment may be a scattered pilot.

The scattered pilot may be a pilot that is constantly inserted in time and frequency directions, used for channel estimation and synchronization, and used as 8 patterns from PP1 to PP8 according to FFT and a protection section. These patterns is designed according to a maximum length 1/Dx of the protection section and channel Doppler limit 1/Dy, and a pilot size for each respective pattern is higher than general data by as much as 2.5 to 7.4 dB. Thus, overhead due to pilot insertion may be reduced while maintaining sufficient channel estimation performance.

In addition, as illustrated in FIG. 4, the subcarriers allocated to the signaling data may be randomly arranged and the subcarriers allocated to the reference signal may be arranged at an equal interval.

The preamble symbol synchronization unit 520 may detect a preamble signal among received signals and perform synchronization of the preamble symbol.

In detail, the preamble symbol synchronization unit 520 may scan an initial signal enough to detect a preamble signal only to detect the preamble symbol in order to rapidly a T2 signal.

In addition, the preamble symbol synchronization unit 520 may perform synchronization using the aforementioned C-A-B structure 300 of FIG. 3B.

That is, the preamble symbol synchronization unit 520 may perform synchronization using a correlation between two portions of the C-A-B structure. Here, in the C-A-B structure, a portion of regions C and A may be considered as one portion, and another portion of regions B and A may be considered as another portion. In this case, the preamble symbol synchronization unit 520 may perform synchronization via a correlation between the two portions.

In addition, the preamble symbol synchronization unit 520 may compensate for a frequency offset. In this regard, when there is a need to install many radio stations for transmitting carriers with the same frequency, the carriers, frequencies of which are slightly changed, may be transmitted in order to prevent obstacles in a receiver side. In this case, the frequency offset is a difference between nominal frequencies obtained by slightly changing an actually used frequency. For example, when A is a nominal frequency and B is a frequency obtained by intentionally reducing or increasing A, a difference between the frequencies A and B is called the frequency offset.

Thus, the preamble symbol synchronization unit 520 may compensate for the frequency offset to correct delay that occurs in a frequency domain.

Here, the preamble symbol synchronization unit 520 may compensate for a frequency offset in a range of ±0.5 carriers, which is called coarse frequency offset compensation.

The channel estimator 530 may detect the reference signal included in the preamble symbol and perform channel estimation using the detected reference signal.

Here, the subcarriers allocated to the reference signal are arranged at an equal interval. Thus, the channel estimator 530 may perform channel estimation based on a data rate of each respective subcarrier allocated to the reference signal.

For example, when a transmitting apparatus allocate subcarriers to the reference signal, maps signals with a size of 1 to the subcarriers, and transmits the signals, if a data rate of the subcarriers allocated to the reference signal received by a receiving apparatus from the transmitting apparatus does not reach 1, the channel estimator 530 may determine a channel state as being not good.

In addition, when the transmitting apparatus allocate the subcarriers to the reference signal, maps signals with a size of 1 to the subcarriers, and transmits the signals, the data rate of the subcarriers allocated to the reference signal received by the receiving apparatus from the transmitting apparatus is 1, the channel estimator 530 may determine the channel state as being standard. When the data rate of the subcarriers allocated to the reference signal received by the receiving apparatus from the transmitting apparatus exceeds 1, the channel estimator 530 may determine the channel state as being good.

That is, since the subcarriers allocated to the reference signal are arranged at an equal interval, the channel estimator 530 may determine a transmission amount of each subcarrier allocated to the reference signal and compare the transmission amount with a size of a signal transmitted from the transmitting apparatus to perform channel estimation on each subcarrier allocated to the reference signal.

The channel estimator 530 may use channel estimation information based on the reference signal as channel estimation information of the data symbol.

That is, the channel estimator 530 may perform channel estimation based on the reference signal included in the preamble symbol and perform channel estimation on the data symbol based on the channel estimation based on the reference signal.

That is, a ratio of the reference signal included in the data symbol is reduced such that an amount of data contained in the data symbol is increased, and thus more data may be increased to increase a transmission rate.

The IFO compensator 540 may compensate for IFO using the detected reference signal.

Here, the IFO compensation is different from coarse frequency offset compensation performed by the aforementioned preamble symbol synchronization unit 520.

In detail, the preamble symbol synchronization unit 520 may compensate for a frequency offset in a range of ±0.5 carriers. On the other hand, the IFO compensator 540 may also compensate for a frequency offset in a range that exceeds ±0.5 carriers.

Figure 6A:
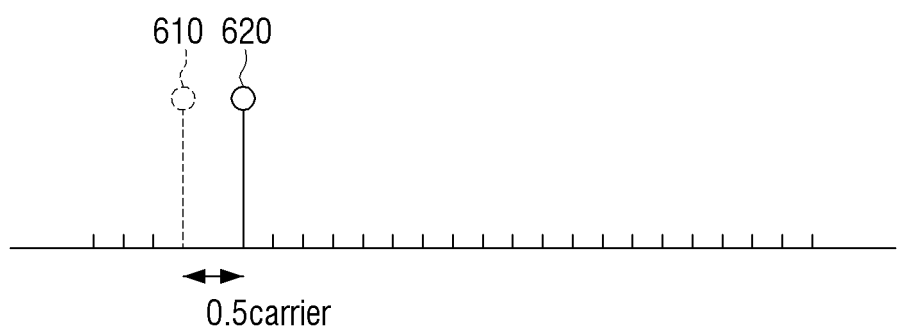
FIGS. 6A and 6B are diagrams for explanation of an operation of an integer frequency offset (IFO) compensator according to an exemplary embodiment.

For example, referring to FIG. 6A, a delay occurs by as much as 0.5 carriers compared with a position 610 of a subcarrier, which is originally intended to be received, such that a position 620 of a subcarrier that is actually received is different from the position 610 in a range of ±0.5 carriers, and thus, the preamble symbol synchronization unit 520 may compensate for a frequency offset.

Figure 6B:
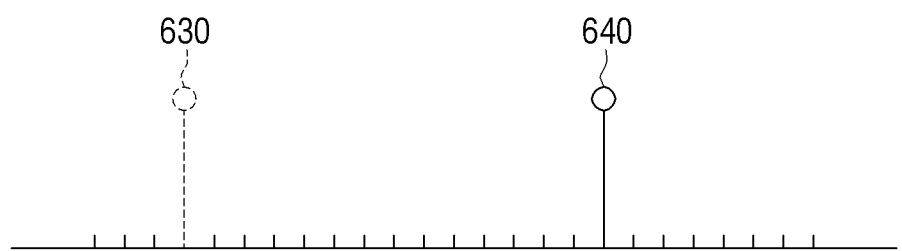

However, as illustrated in FIG. 6B, a delay may occur by more than 0.5 carriers compared with a position 630, which is originally intended to be received, such that a position 640 of a subcarrier that is actually received is different from the position 630 in a range that exceeds ±0.5 carriers, and thus, the preamble symbol synchronization unit 520 may not compensate for the frequency offset and the IFO compensator 540 may perform IFO compensation using the reference signal.

In addition, a process for compensating for an integer frequency offset of the IFO compensator 540 will now be described in detail. The IFO compensator 540 IFFT converts a signal output from the channel estimator 530 into a signal in a time domain and performs main echo search to detect a subcarrier with a largest signal.

In addition, the integer frequency offset may be compensated for using one of a time shift frequency mod method, an RE-FFT method, and a method of converting CIRA into CP for equalization.

The decoder 550 may detect the signaling data included in the preamble symbol and decode the detected signaling data. Here, the decoder 550 may perform DBPSK demodulation to receive S1 and S2 sequences and to decode the signaling data.

Although not illustrated in FIG. 5, the receiving apparatus 500 may further include an FFT unit (not shown). The preamble symbol synchronization unit 520 may detect the preamble symbol, synchronize the preamble symbol, compensate for a frequency offset, and then convert a signal in a time domain into a signal in a frequency domain via the FFT unit (not shown). The FFT unit (not shown) may convert a signal in a time domain into a signal in a frequency domain, and then, the channel estimator 530 may detect the reference signal to perform channel estimation.

Figure 7:
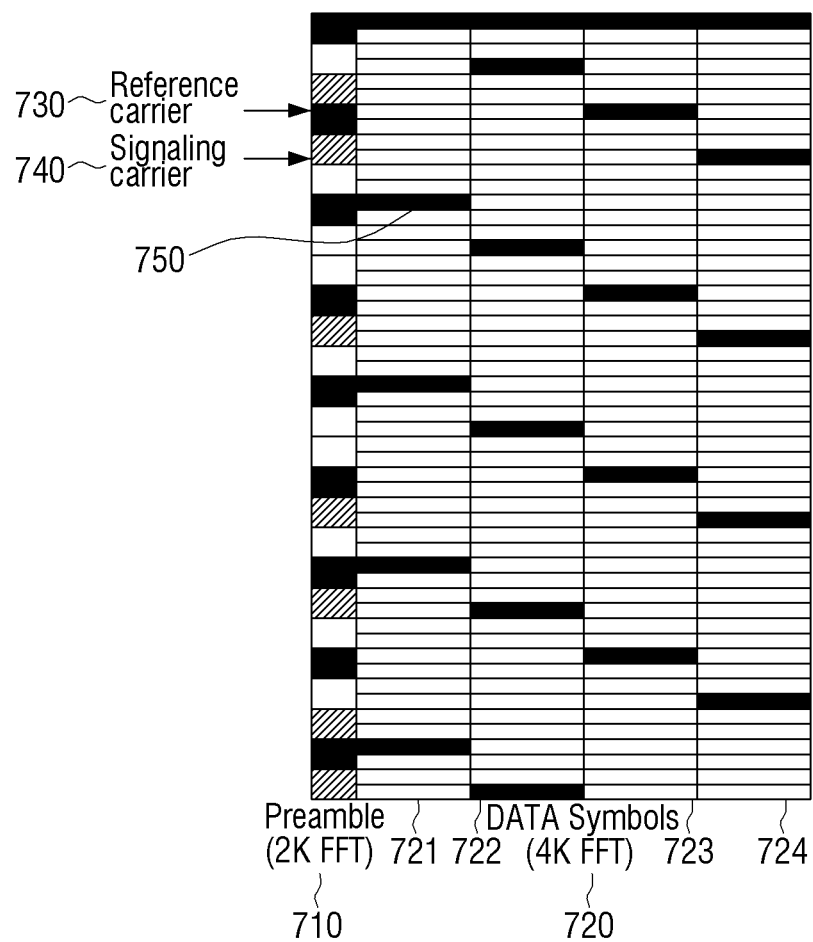
FIG. 7 is a diagram illustrating a preamble symbol and a data symbol to which a reference signal is inserted according to an exemplary embodiment.

FIG. 7 is a diagram illustrating a preamble symbol and a data symbol to which a reference signal is inserted according to an exemplary embodiment.

Referring to FIG. 7, a preamble symbol 710 has a size of 2K FFT, a data symbol 720 has a size of 4K FFT, subcarriers 730 allocated to a reference signal are arranged at an equal interval in the preamble symbol 710, and subcarriers 750 allocated to signaling data are randomly arranged.

In detail, when the subcarriers 730 allocated to the reference signal inserted into the preamble symbol 710 are arranged at an equal interval corresponding to a size of 3 and the subcarriers 730 are arranged in only one row, the subcarriers 730 allocated to the reference signal inserted into the preamble symbol 710 are arranged with patterns in Dx=3 and Dy=1.

The subcarriers 750 allocated to the reference signal are also inserted into the data symbol 720.

In detail, when the subcarriers 750 allocated to the reference signal inserted into the data symbol 720 are arranged at an equal interval corresponding to a size of 12 and arranged in four rows, the subcarriers 750 allocated to the reference signal inserted into the data symbol 720 are arranged in patterns with Dx=3 and Dy=4.

That is, when the subcarriers 750 allocated to the reference signal inserted into the data symbol 720 are arranged at an equal interval corresponding to a size of 12 in a first row 721 of the data symbol 720, the subcarriers 750 allocated to the reference signal inserted into a second row 722 of the data symbol 720 are arranged with a difference of 3 rooms with the subcarriers 750 allocated to the reference signal inserted into the first row 721 of the data symbol 720 instead of at an equal interval corresponding to a size of 12 at the same position as the first row 721 of the data symbol 720.

Similarly, subcarriers allocated to a reference signal inserted into a third row 723 of the data symbol 720 are also arranged with a difference of 3 rooms with the subcarriers allocated to the reference signal inserted into the second row 722 of the data symbol 720, and subcarriers allocated to a reference signal inserted into a fourth row 724 of the data symbol 720 are also arranged with a difference of 3 rooms with the subcarriers allocated to the reference signal inserted into the third row 723 of the data symbol 720.

Thus, when subcarriers are arranged with a difference of 3 rooms with the subcarriers allocated to the reference signal inserted into the fourth row 724 of the data symbol 720, the subcarriers are arranged at the same position as the subcarriers allocated to the reference signal inserted into the first row 721 of the data symbol 720.

The channel estimator 530 may perform channel estimation using the subcarriers 730 allocated to the reference signal inserted into the preamble symbol 710.

Here, the subcarriers 730 allocated to the reference signal are arranged at an equal interval. Thus, the channel estimator 530 may perform channel estimation based on a transmission amount of each of the subcarriers 730 allocated to the reference signal.

A method of performing channel estimation based on a transmission amount of the subcarriers 730 allocated to the reference signal has been described above, and thus, a detailed description thereof is not given here.

That is, since the subcarriers 730 allocated to the reference signal are arranged at an equal interval, the channel estimator 530 may determine the transmission amount of each of the subcarriers 730 allocated to the reference signal and compare the transmission amount with a size of a signal transmitted from the transmitting apparatus to perform channel estimation on each of the subcarriers 730 allocated to the reference signal.

The channel estimator 530 may use channel estimation information based on the reference signal included in the preamble symbol 710 as channel estimation information of the data symbol.

That is, the channel estimator 530 may perform channel estimation based on the reference signal included in the preamble symbol.

Thus, a ratio of the reference signal included in the data symbol 720 is reduced such that an amount of data contained in the data symbol is increased, and thus, more data may be increased to increase a transmission rate.

Figure 8:
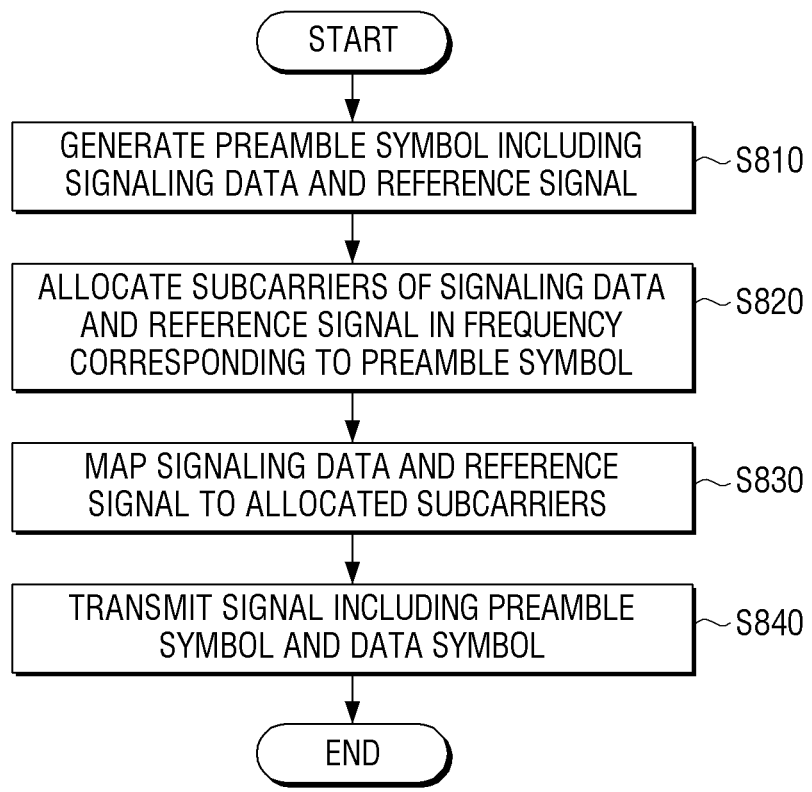
FIG. 8 is a flowchart for explanation of a controlling method of a transmitting apparatus according to an exemplary embodiment.

FIG. 8 is a flowchart for explanation of a controlling method of a transmitting apparatus according to an exemplary embodiment.

In the method illustrated in FIG. 8, a preamble symbol including signaling data and a reference signal may be generated (S810).

Here, the reference signal may be a signal for channel estimation or frequency offset compensation. In addition, according to an exemplary embodiment, the reference signal may be a pilot.

In addition, subcarriers may be allocated to the signaling data and the reference signal in a frequency corresponding to the preamble symbol (S820).

In allocating the subcarriers, a subcarrier of the reference signal among subcarriers except for the subcarriers allocated to the data signaling may be allocated in a frequency corresponding to the preamble symbol.

In addition, in allocating the subcarriers, the subcarrier of the signaling data and the subcarrier of the reference signal may be randomly allocated, and the subcarriers of the reference signal may be allocated at an equal interval.

In addition, the signaling data and the reference signal may be mapped to the allocated subcarriers (S830).

In addition, a signal including the preamble symbol and the data symbol may be transmitted (S840).

FIG. 9 is a flowchart for explanation of a controlling method of a receiving apparatus according to an exemplary embodiment.

In the method illustrated in FIG. 9, a signal including a preamble symbol and a data symbol may be received (S910).

In addition, the preamble symbol of the received signal may be detected, the preamble symbol may be synchronized, and a frequency offset may be compensated for (S920).

Here, the preamble symbol may include signaling data and a reference signal.

Here, the reference signal may be a signal for channel estimation or frequency offset compensation. In addition, according to an exemplary embodiment, the reference signal may be a pilot.

In addition, subcarriers allocated to the signaling data may be randomly arranged and subcarriers allocated to the reference signal may be arranged at an equal interval.

The reference signal included in the preamble symbol may be detected and channel estimation may be performed using the detected reference signal (S930).

Here, in the channel estimation, the channel estimation may be performed based on a transmission amount of each subcarrier allocated to the reference signal.

In addition, in the channel estimation, channel estimation information based on the reference signal may be used as channel estimation information of the data symbol.

In addition, IFO may be compensated for using the detected reference signal (S940).

The signaling data included in the preamble symbol may be detected and the detected signaling data may be decoded (S950).

As described above, according to various exemplary embodiments, synchronization may be accurately corrected and channel estimation is achieved using the reference signal included in the preamble symbol, thereby reducing a ratio of a pilot included in a data symbol.

An exemplary embodiment provides a non-transitory computer readable medium for storing a program that sequentially executes the controlling method according to the above embodiments.

For example, an embodiment provides a non-transitory computer readable medium for storing a program that executes generating a preamble symbol including signaling data and a reference signal, allocating subcarriers to the signaling data and the reference signal in a frequency corresponding to the preamble symbol, mapping the signaling data and the reference signal to the allocated subcarriers, and generating a signal including a preamble symbol and a data symbol.

In addition, for example, an embodiment provides a non-transitory computer readable medium for storing a program that executes detecting a preamble symbol of a received signal and synchronizing the preamble symbol to compensating for frequency offset, detecting a reference signal included in the preamble signal and performing channel estimation using the reference signal, compensating for IFO using the reference signal, and detecting the signaling data included in the preamble symbol and decoding the signaling data.

A non-transitory computer readable medium refers to a medium that is capable of semi-permanently storing and reading data via a device instead of a medium that stores data for a short period of time such as a register, a cache, a memory, etc. In detail, the aforementioned various application or programs may be stored or provided to a non-transitory computer readable medium such as a compact disk (CD), a digital versatile disk (DVD), a hard disk, a blu-ray disk, a universal serial bus (USB), a memory card, a read-only memory (ROM), etc.

The block diagrams in FIGS. 1, 2A, 3A, 5, 8 and 9 illustrate apparatuses or methods according to the exemplary embodiments. In this regard, at least one of the blocks or components of the apparatus or method may represent a module, a program, or a part of code, which contains one or more executable instructions for performing specified logic functions. It should also be noted that block diagrams may be implemented by a dedicated hardware-based system for performing specified functions or operations, by a software-based system for performing specified functions or operations, or by a combination of dedicated hardware and computer instructions Although a bus is not illustrated in the above block diagram illustrating a transmitting apparatus and a receiving apparatus, communication between components of the transmitting and receiving apparatuses may be achieved through the bus. In addition, each of the transmitting apparatus and the receiving apparatus may further include a processor for performing the aforementioned various operations, such as a central processing unit (CPU), a microprocessor, etc.

The foregoing exemplary embodiments and advantages are merely exemplary and are not to be construed as limiting the inventive concept. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A transmitting apparatus comprising:
    a frequency allocator configured to map signaling data to first subcarriers of a preamble symbol, and map a reference signal to second subcarriers of the preamble symbol; and
    a transmitter configured to transmit a frame comprising the preamble symbol and a data symbol to a receiving apparatus,
    wherein the reference signal is used for at least one of channel estimation and frequency offset compensation in the receiving apparatus,
    wherein the signalling data is used for decoding the data symbol in the receiving apparatus, and
    wherein the first subcarriers are positioned at a non-fixed interval in the preamble symbol, and the second subcarriers are positioned at a fixed interval in the preamble symbol.

2. The transmitting apparatus of claim 1, wherein the frequency allocator randomly allocates the first subcarriers to the signaling data, and allocates the second subcarriers to the reference signal at an equal interval.

3. The transmitting apparatus of claim 2, wherein the frequency allocator randomly allocates the first subcarriers of the signaling data such that a peak to average power ratio is equal to or less than a preset value at the transmitter.

4. The transmitting apparatus of claim 1, further comprising a symbol generator which generates the preamble symbols in a T2 frame defined in the Digital Video Broadcasting the Second Generation Terrestrial (DVB-T2) standard, and
    wherein the reference signal is a pilot of the T2 frame and the signaling data is S1/S2 signaling data of the T2 frame.

5. A receiving apparatus comprising:
    a receiver configured to receive a frame comprising a preamble symbol and a data symbol;
    a symbol synchronization unit configured to detect the preamble symbol of the received frame, synchronize the preamble symbol and compensate for a frequency offset;
    a channel estimator configured to detect a reference signal included in the preamble symbol and perform channel estimation;
    an integer frequency offset (IFO) compensator configured to compensate for an IFO using the reference signal; and
    a decoder configured to detect signaling data included in the preamble symbol and decode the data symbol using the detected signaling data,
    wherein the signaling data is mapped to first subcarriers of the preamble symbol, and the reference signal is mapped to second subcarriers of the preamble symbol; and
    wherein the reference signal is used for at least one of the channel estimation and frequency offset compensation in the receiving apparatus, and
    wherein the first subcarriers are positioned at a non-fixed interval in the preamble symbol, and the second subcarriers are positioned at a fixed interval in the preamble symbol.

6. The receiving apparatus of claim 5, wherein the first subcarriers allocated to the signaling data are randomly arranged and the second subcarriers allocated to the reference signal are arranged at an equal interval.

7. The receiving apparatus of claim 6, wherein the channel estimator performs channel estimation based on a transmission amount of each of the second subcarriers allocated to the reference signal.

8. The receiving apparatus of claim 7, wherein the channel estimator uses channel estimation information based on the reference signal as channel estimation information of the data symbol.

9. The receiving apparatus of claim 5, wherein the preamble symbol is included in a T2 frame defined in the Digital Video Broadcasting the Second Generation Terrestrial (DVB-T2) standard, and
    wherein the reference signal is a pilot of the T2 frame and the signaling data is S1/S2 signaling data of the T2 frame.

10. A controlling method of a transmitting apparatus, the method comprising:

mapping signaling data to first subcarriers of a preamble symbol, and mapping a reference signal to second subcarriers of the preamble symbol; and transmitting a frame comprising the preamble symbol and a data symbol to a receiving apparatus, wherein the reference signal is used for at least one of channel estimation and frequency offset compensation in the receiving apparatus, and wherein the first subcarriers are positioned at a non-fixed interval in the preamble symbol, and the second subcarriers are positioned at a fixed interval in the preamble symbol.

11. The method of claim 10, wherein the first subcarriers are randomly allocated to the signaling data, and the second subcarriers are allocated to the reference signal at an equal interval.

12. The method of claim 11, wherein the randomly allocating is performed such that a peak to average power ratio is equal to or less than a preset value at a transmitter of the frame.

13. The method of claim 10, wherein the preamble symbol is included in a T2 frame defined in the Digital Video Broadcasting the Second Generation Terrestrial (DVB-T2) standard, and the reference signal is a pilot of the T2 frame, and the signaling data is S1/S2 signaling data of the T2 frame.

14. A controlling method of a receiving apparatus, the method comprising:

receiving a frame comprising a preamble symbol and a data symbol;

detecting the preamble symbol of the received frame, synchronizing the preamble symbol and compensating for a frequency offset;

detecting a reference signal included in the preamble symbol and performing channel estimation;

compensating for an integer frequency offset (IFO) using the reference signal; and detecting signaling data included in the preamble symbol and decoding the signaling data, wherein the signaling data is mapped to first subcarriers of the preamble symbol, and the reference signal is mapped to second subcarriers of the preamble symbol; and wherein the reference signal is used for at least one of the channel estimation and frequency offset compensation in the receiving apparatus, and wherein the first subcarriers are positioned at a non-fixed interval in the preamble symbol, and the second subcarriers are positioned at a fixed interval in the preamble symbol.

15. The method of claim 14, wherein first subcarriers allocated to the signaling data are randomly arranged and second subcarriers allocated to the reference signal are arranged at an equal interval.

16. The method of claim 15, wherein the performing the channel estimation comprises performing channel estimation based on a transmission amount of each of the second subcarriers allocated to the reference signal.

17. The method of claim 16, wherein the channel estimation is performed using channel estimation information based on the reference signal as channel estimation information of the data symbol.

18. The method of claim 14, wherein the preamble symbol is included in a T2 frame defined in the Digital Video Broadcasting the Second Generation Terrestrial (DVB-T2) standard, and the reference signal is a pilot of the T2 frame, and the signaling data is S1/S2 signaling data of the T2 frame.

* * * * *